(12) United States Patent
Jeon et al.

(10) Patent No.: US 11,734,094 B2
(45) Date of Patent: Aug. 22, 2023

(54) MEMORY COMPONENT QUALITY STATISTICS

(71) Applicant: Micron Technology, Inc., Boise, ID (US)

(72) Inventors: Seungjune Jeon, Santa Clara, CA (US); Tingjun Xie, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 235 days.

(21) Appl. No.: 16/997,562

(22) Filed: Aug. 19, 2020

(65) Prior Publication Data

US 2022/0058071 A1 Feb. 24, 2022

(51) Int. Cl.
*G06F 11/00* (2006.01)
*G06F 11/07* (2006.01)
*G06F 11/34* (2006.01)
*G06F 11/30* (2006.01)

(52) U.S. Cl.
CPC ........ *G06F 11/076* (2013.01); *G06F 11/0727* (2013.01); *G06F 11/3034* (2013.01); *G06F 11/3476* (2013.01)

(58) Field of Classification Search
CPC .............. G06F 11/076; G06F 11/0727; G06F 11/3034; G06F 11/0754; G06F 11/3476; G11C 29/04; G11C 29/52
See application file for complete search history.

(56) References Cited

U.S. PATENT DOCUMENTS

| 9,886,341 | B2 | 2/2018 | Das |
| 10,282,252 | B2 | 5/2019 | Park |
| 2009/0172335 | A1 | 7/2009 | Kulkarni et al. |
| 2010/0106906 | A1 | 4/2010 | Galloway et al. |
| 2012/0191921 | A1* | 7/2012 | Shaeffer ............... G06F 13/4072 710/316 |
| 2014/0380123 | A1* | 12/2014 | Liikanen ................. G06F 11/08 714/764 |

(Continued)

OTHER PUBLICATIONS

Maxfield, Max, ASIC, ASSP, SoC, FPGA—What's the Difference?, Jun. 23, 2014, EE Times, "https://www.eetimes.com/asic-assp-soc-fpga-whats-the-difference/" (Year: 2014).*

(Continued)

*Primary Examiner* — Marc Duncan
(74) *Attorney, Agent, or Firm* — Brooks, Cameron & Huebsch, PLLC

(57) ABSTRACT

A method includes monitoring, by a processing device, error characteristics of a particular memory component among a plurality of memory components of a memory sub-system and detecting, by the processing device and based on the monitored error characteristics, an error characteristic associated with the particular memory component that exhibits a value that is greater than or equal to a threshold error characteristic value. The method can further include causing, by the processing device, a counter coupled to the plurality of memory components to be updated in response to the detection that the particular memory component exhibits the value of the error characteristic that is greater than or equal to the threshold error characteristic value.

20 Claims, 4 Drawing Sheets

(56) References Cited

U.S. PATENT DOCUMENTS

| | | | |
|---|---|---|---|
| 2015/0162100 A1* | 6/2015 | Motwani | G11C 29/82 |
| | | | 714/719 |
| 2015/0378815 A1 | 12/2015 | Goda et al. | |
| 2016/0049203 A1 | 2/2016 | Alrod et al. | |
| 2020/0159601 A1* | 5/2020 | Asmussen | G06F 11/076 |

OTHER PUBLICATIONS

Hwang, Seung H. et al., A Reliability Testing Environment for Off-the-Shelf Memory Subsystems, 2000, IEEE (Year: 2000).*

* cited by examiner

MEMORY COMPONENT QUALITY STATISTICS

TECHNICAL FIELD

Embodiments of the disclosure relate generally to memory sub-systems, and more specifically, relate to memory component quality statistics.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
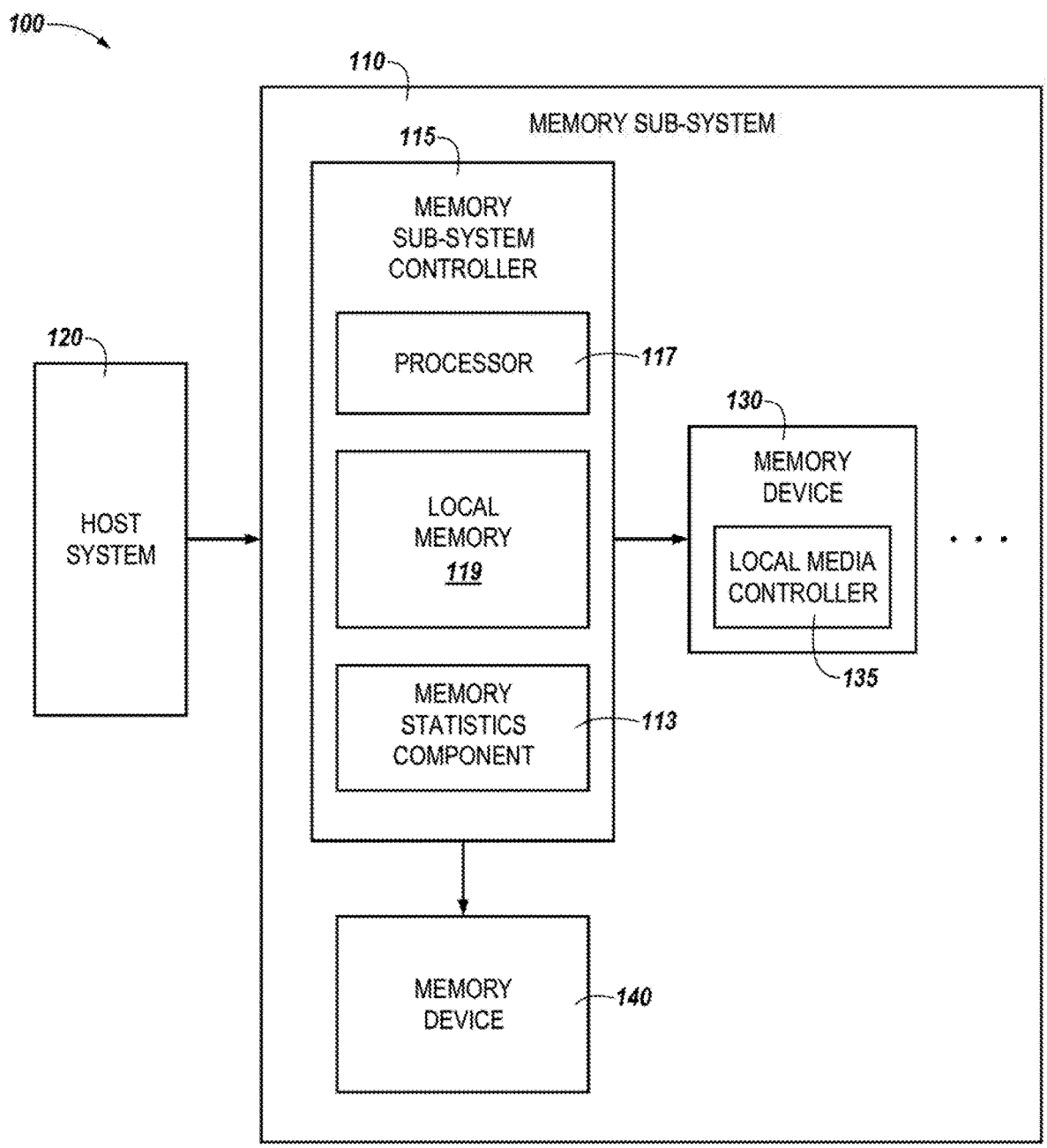
FIG. 1 illustrates an example computing system that includes a memory sub-system in accordance with some embodiments of the present disclosure.

Aspects of the present disclosure are directed to memory component quality statistics, in particular to memory sub-systems that include a memory sub-system memory statistics component to determine memory component quality statistics. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of a non-volatile memory device is a three-dimensional cross-point memory device that include a cross-point array of non-volatile memory cells. Other examples of non-volatile memory devices are described below in conjunction with FIG. 1. A non-volatile memory device, such as a three-dimensional cross-point memory device, can be a package of one or more memory components (e.g., memory dice). Each die can consist of one or more planes. Planes can be grouped into logic units. For example, a non-volatile memory device can be assembled from multiple memory dice, which can each form a constituent portion of the memory device.

Due to process variation, distances signals must travel through a memory sub-system, and/or because a non-volatile memory device can be formed of one or more memory dice, signal reliability (e.g., electrical signal reliability) across or through the memory sub-system can be non-uniform. Non-uniform signal reliability can lead to degraded and/or unpredictable performance of the memory sub-system. Further, the non-uniform signal reliability that can be associated with a memory device can be amplified based on a workload the memory sub-system is subjected to and/or characteristics of the environment in which the memory sub-system is deployed, such as the ambient temperature of a location in which the memory sub-system operation.

In some memory devices, such as three-dimensional cross-point memory devices, a minimum system access unit can generally be spread across more than one memory component (e.g., memory die) die. Accordingly, when a memory operation (e.g., a read, write, or other memory operation) is invoked, data can be read from and/or written to locations in different memory dice of the memory device. Because different memory dice can experience different signal reliability, as described above, performance of the memory device as a whole can be degraded when a memory operation is invoked that accesses data stored in or written to different memory dice. For example, the memory die or memory dice that exhibit the lowest signal reliability within the memory device can become a chokepoint or bottlenecks for performance of memory operations.

These and other factors can contribute to unreliable performance of a memory sub-system. For example, stored bits that are in error either as a result of flipped bit or zero-to-one bit flip phenomenon can be exhibited in a memory sub-system, which can contribute to unreliable performance of the memory sub-system. However, because some approaches do not allow for visibility at the memory die level, it can be difficult to determine whether such behavior is a result of a particular memory die (e.g., physical characteristics, etc. of a particular memory die) or if such behavior is a result of degradation of the entire memory sub-system. For example, because in some approaches memory dice are fabricated and deployed as a field-programmable gate array, it can be difficult or even impossible to monitor and determine characteristics of individual memory dice within the memory sub-system.

Aspects of the present disclosure address the above and other deficiencies by allowing for visibility to individual memory dice of the memory sub-system. As described herein, the memory dice can be monitored and analyzed on a die-by-die basis, which can allow for performance characteristics, performance statistics, and other information to be collected and analyzed for individual memory die in a memory sub-system. In one embodiment, such visibility to the individual memory die is realized by deploying the memory dice as application-specific integrated circuits (ASICs) within the memory sub-system. By providing the memory dice as ASICs, visibility to each memory die can be achieved.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include an memory statistics component 113. Although not shown in FIG. 1 so as to not obfuscate the drawings, the memory statistics component 113 can include various circuitry to facilitate detection of error characteristics associated with particular memory components (e.g., memory dice) that exhibit a value that is greater than or equal to a threshold error characteristic value and incrementation of a counter coupled to the memory components to be updated in response to the detection that the particular memory component exhibits the value of the error characteristic that is greater than or equal to the threshold error characteristic value. In some embodiments, the memory statistics component 113 can include a special purpose circuitry in the form of an ASIC, FPGA, state machine, and/or other logic circuitry that can allow the memory statistics component 113 to orchestrate and/or perform operations described herein.

In some embodiments, the memory sub-system controller 115 includes at least a portion of the memory statistics component 113. For example, the memory sub-system controller 115 can include a processor 117 (processing device) configured to execute instructions stored in local memory 119 for performing the operations described herein. In some embodiments, the memory statistics component 113 is part of the host system 110, an application, or an operating system.

Figure 2:
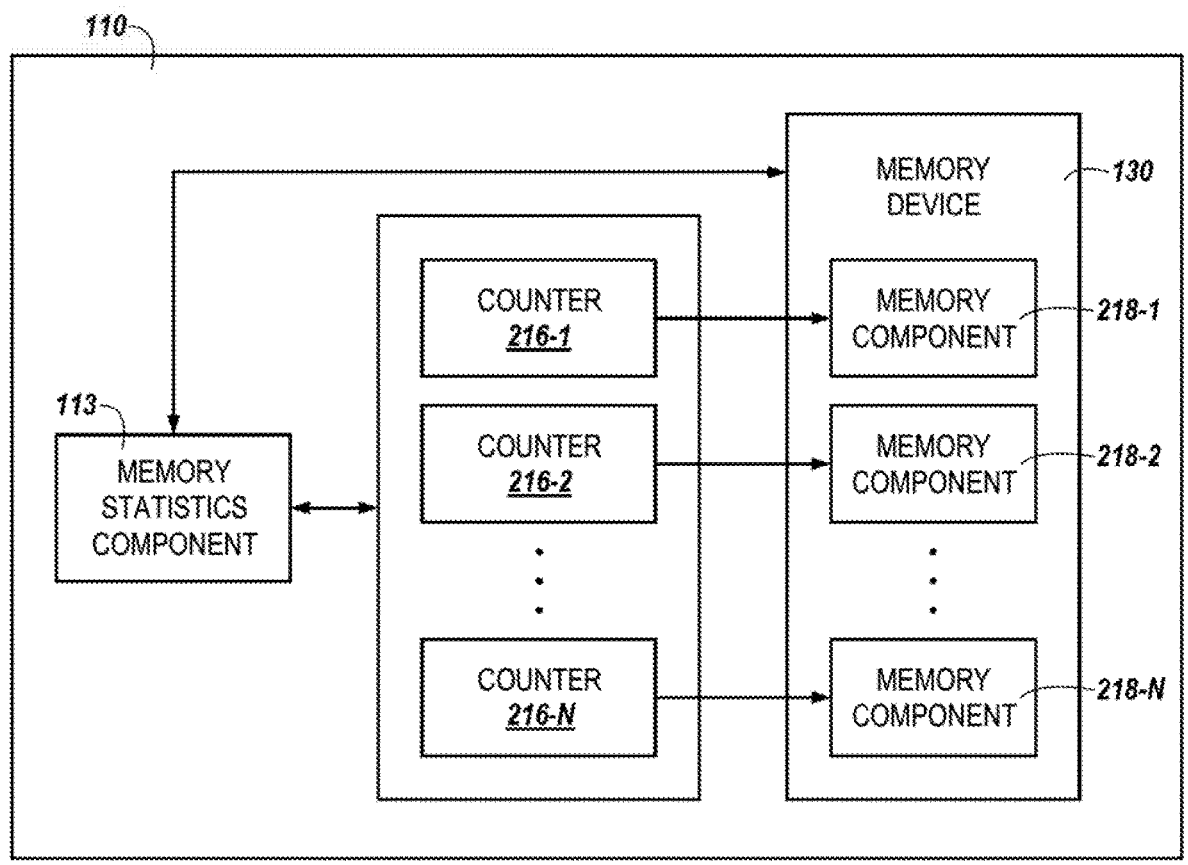
FIG. 2 illustrates an example memory sub-system in accordance with some embodiments of the present disclosure.

FIG. 2 illustrates an example memory sub-system 110 in accordance with some embodiments of the present disclosure. The memory sub-system 110 can be analogous to the memory sub-system 110 illustrated in FIG. 1, herein. As shown in FIG. 2, the memory sub-system 110 can include an memory statistics component 113, which can be coupled to counters 216-1 to 216-N and/or to a memory device 130 that can include one or more memory components 218-1 to 218-N (e.g., memory dice).

The counters 216-1 to 216-N can include hardware that can store one or more values (e.g., logical values, numerical values, etc.). For example, the counters 216-1 to 216-N can be a cache (e.g., an SRAM cache), register/registers, latches, or the like. The values written to, or stored by, the counters 216-1 to 216-N can correspond to monitored characteristics of the memory components 218-1 to 218-N that are collected by the memory statistics component 113.

The memory components 218-1 to 218-N can be individual memory dice or "packages." As used herein, a memory component generally refers to a block of semiconducting material on which a memory circuit is fabricated. For purposes of this disclosure, a memory component is the smallest constituent building block of a memory device, such as the memory device 130. Accordingly, in some embodiments, the memory device 130 is built from multiple memory components 218-1 to 218-N. The term memory component can be used interchangeably with the term "memory die" or "memory package," herein.

As shown in FIG. 2, the memory components 218-1 to 218-N are coupled to respective counters 216-1 to 216-N and to the memory statistics component 113. In some embodiments, the memory statistics component 113 can monitor the memory components 218-1 to 218-N on a component-by-component level. That is, the memory statistics component 113 can monitor each (or at least some) of the memory components 218-1 to 218-N individually to determine error characteristics associated with the memory components 218-1 to 218-N during operation of the memory sub-system 110.

A non-limiting example of an error characteristic that can be determined by the memory statistics component 113 can include a determination of a quantity codeword correction failures corresponding to a particular memory component 218. The quantity of codeword correction failures can include a quantity of codeword correction failures including transient failures in each performed recovery step for the particular memory component 218.

Another non-limiting example of an error characteristic that can be determined by the memory statistics component 113 can include a determination of a quantity of bit flip errors within codewords and/or a zero-to-one bit flip count for the codewords. A bit flip error can occur when a value of "1" that is part of a codeword erroneously changes to a value of "0," while a zero-to-one bit flip error can occur when a value of "0" that is part of a codeword erroneously changes to a value of "1."

For example, an error characteristic that can be determined by the memory statistics component 113 can include a determination of a quantity of codewords that include a quantity of bit flip errors that exceed a particular threshold that are stored by a particular memory component 218. The quantity of codewords that include a quantity of bit flip errors that exceed the particular threshold and are stored by the particular memory component 218 can be determined by performance of a read verify operation invoked by the memory statistics component 113 and/or by other circuitry of the memory sub-system, such as the memory sub-system controller 115 illustrated in FIG. 1, herein.

The counters 216-1 to 216-N can be incremented in response to a determination that one or more of the above enumerated error characteristics, among others, has been detected by the memory statistics component 113. The memory statistics component 113 can analyze information stored by the counters 218-1 to 218-N to determine the quality and/or behavior of the different memory components 218-1 to 218-N on a component-by-component basis. This can allow for more accurate statistics corresponding to the quality and/or behavior of each individual memory component 218-1 to 218-N to be collected and analyzed, in contrast to approaches that merely analyze the quality and/or behavior of the entire memory device 130.

In a non-limiting example, an apparatus can include a processing device (e.g., the memory statistics component 113 and/or the processor 117 illustrated in FIG. 1) and a memory sub-system 110 that includes one or more memory dice (e.g., the memory components 218-1 to 218-N) communicatively coupled to the processing device. The processing device can be configured to monitor characteristics of the memory dice during operation of the memory sub-system 110 and cause statistics counters 216-1 to 216-N coupled to the memory dice to be updated in response to detection of an event involving the monitored characteristics.

The monitored characteristics of the memory dice can include a quantity of codeword errors and/or a quantity of codeword errors for corrected codewords. For example, the monitored characteristics of the memory dice can include a quantity of codewords having a bit flip count greater than a threshold bit flip count value associated therewith and/or a zero-to-one bit flip count greater than a threshold zero-to-one bit flip count value associated therewith. In some embodiments, the processing device can be configured to analyze information stored by the statistics counters to determine quality characteristics of the plurality of memory dice.

As described above, the memory dice can be provided in the form of an application-specific integrated circuit. In some embodiments, the processing device can assign workloads to particular memory dice based, at least in part, on the quality characteristics of the plurality of memory dice. Embodiments are not so limited, however, and in some embodiments, the processing device can cause performance of a debugging operation invoking at least one of the memory dice based, at least in part, on the quality characteristics of the memory dice.

In another non-limiting example, a system (e.g., the computing system 100) can include a memory statistics component 113. The memory statistics component 113 can be resident on the memory sub-system 110. As used herein, the term "resident on" refers to something that is physically located on a particular component. For example, the memory statistics component 113 being "resident on" the memory sub-system 110 refers to a condition in which the hardware circuitry that comprises the memory statistics component 113 is physically located on the memory sub-system 110. The term "resident on" may be used interchangeably with other terms such as "deployed on" or "located on," herein.

The memory statistics component 113 can be coupled to a plurality of counters 216-1 to 216-N and to a memory device 130 that includes one or more memory components 218-1 to 218-N (e.g., memory dice). The memory statistics component 113 can perform operations that include monitoring characteristics of codewords written to the plurality of memory components 218-1 to 218-N. The monitored characteristics of the codeword can include a quantity of codeword errors and/or a quantity of codeword errors for corrected codewords. For example, the monitored characteristics of the codewords include a quantity of codewords having a bit flip count greater than a threshold bit flip count value associated therewith and/or a zero-to-one bit flip count greater than a threshold zero-to-one bit flip count value associated therewith.

The memory statistics component 113 can perform operations including causing respective counters 216-1 to 216-N to be updated in response to detection of an event involving the monitored characteristics of the codewords written to the memory components 218-1 to 218-N and analyzing information stored by the counters 216-1 to 216-N to determine quality characteristics of each of the memory components 218-1 to 218-N based on the monitored characteristics of the codewords written to the memory components 218-1 to 218-N.

In some embodiments, the memory statistics component 113 can perform operations including performing a debugging operation invoking at least one of the memory components 218-1 to 218-N based, at least in part, on the quality characteristics of the memory components 218-1 to 218-N. The memory statistics component 113 can perform operations including assigning workloads to the memory components 218-1 to 218-N based, at least in part, on the quality characteristics of each of the memory components 218-1 to 218-N. In some embodiments, the memory statistics component 113 can perform operations including monitoring characteristics of codewords written to the memory components 218-1 to 218-N during runtime of a memory sub-system 110 in which the plurality of memory components 218-1 to 218-N are deployed.

Figure 3:
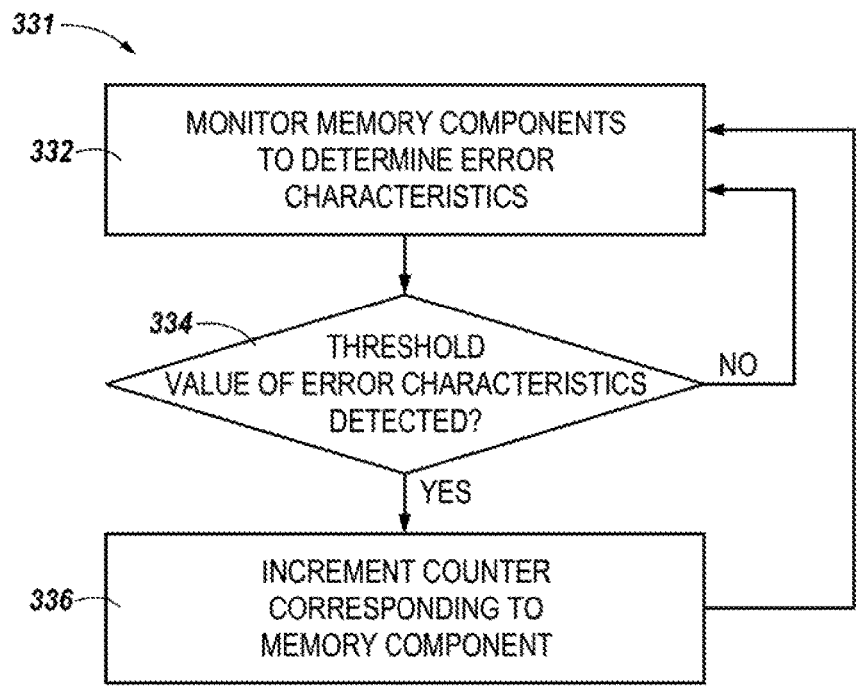
FIG. 3 is a flow diagram for memory component quality statistics in accordance with some embodiments of the present disclosure.

FIG. 3 is a flow diagram 331 for memory component quality statistics in accordance with some embodiments of the present disclosure. At block 332, memory components (e.g., the memory components 218-1 to 218-N illustrated in FIG. 2) can be monitored to determine error characteristics associated with individual memory components. In some embodiments, a processing device (e.g., the processor 117 illustrated in FIG. 1 and/or the memory statistics component 113 illustrated in FIGS. 1 and 2, herein) can monitor the memory components.

At block 334, a determination can be made as to whether a threshold error characteristic value for at least one of the memory components has been detected. If the threshold error characteristic value for at least one of the memory components has not been detected, the flow 331 can return to block 332.

If, however, the threshold error characteristic value has been detected for at least one of the memory components, at block 336, a counter (e.g., the counters 216-1 to 216-N illustrated in FIG. 2, herein) can be incremented. Because the counter(s) are incremented in response to detection of a threshold error characteristic value being detected, the values stored in the counters can correspond to error statistics for each of the memory components. This can allow for the quality of each of the memory components to be monitored and analyzed independently, which can, in contrast to approaches in which individual memory components cannot be monitored, allow for insight into how each of the memory components behave during runtime of a memory sub-system. This insight can allow for memory component failures to be analyzed in more detail than in some approaches, which can further lead to efficient debugging operations to be performed.

Figure 4:
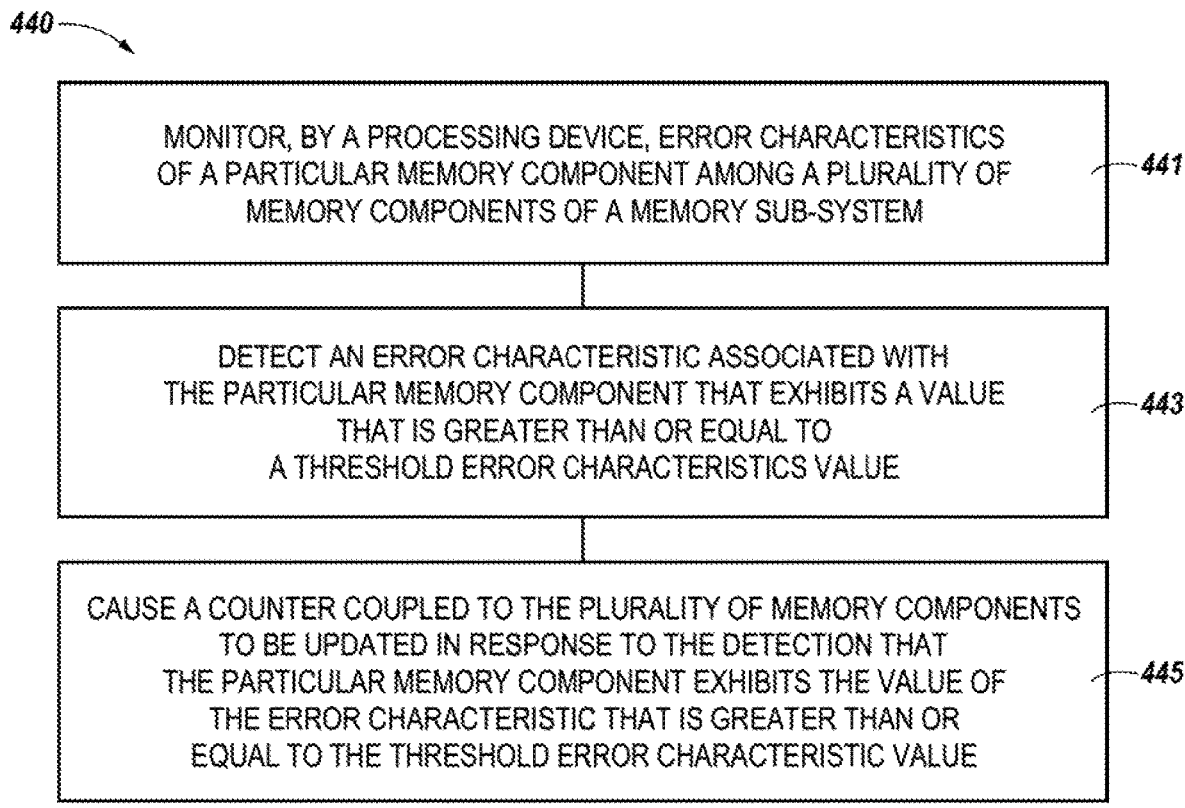
FIG. 4 is a flow diagram corresponding to a method for memory component quality statistics in accordance with some embodiments of the present disclosure.

FIG. 4 is a flow diagram corresponding to a method 440 for memory component quality statistics in accordance with some embodiments of the present disclosure. The method 440 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 440 is performed by the memory statistics component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 441 the method 440 can include monitoring, by a processing device, error characteristics of a particular memory component among memory components of a memory sub-system. In some embodiments, the memory components can be memory dice and/or the memory sub-system can be provided in the form of an application-specific integrated circuit (ASIC), as described above.

The monitored characteristics can include a quantity of codeword errors and/or a quantity of codeword errors for corrected codewords. Embodiments are not so limited, however, and in some embodiments the monitored error characteristics of the memory components can include a quantity of codewords having a bit flip count greater than a threshold bit flip count value associated therewith and/or a zero-to-one bit flip count greater than a threshold zero-to-one bit flip count value associated therewith.

At block 443, the method 440 can include detecting, by the processing device and based on the monitored error characteristics, an error characteristic associated with the particular memory component that exhibits a value that is greater than or equal to a threshold error characteristic value.

At block 445, the method 440 can include causing, by the processing device, a counter coupled to the memory components to be updated in response to the detection that the particular memory component exhibits the value of the error characteristic that is greater than or equal to the threshold error characteristic value.

The method 440 can further include analyzing, by the processing device, information stored by the counter to determine quality characteristics of each of the memory components and/or assigning workloads to the memory components based, at least in part, on the quality characteristics of each of the memory components.

Figure 5:
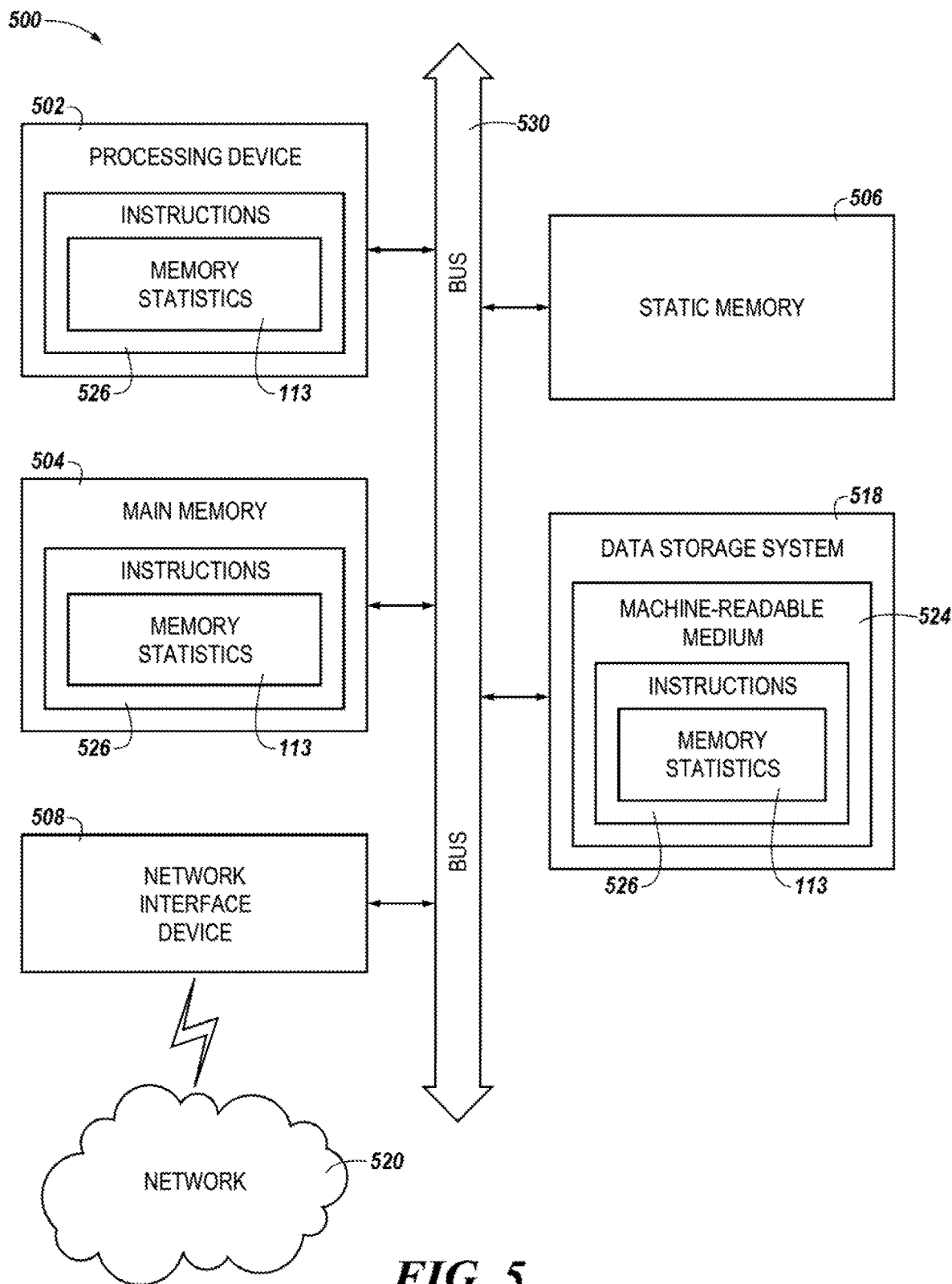
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory statistics component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a memory statistics component (e.g., the memory statistics component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
monitoring, by a processing device, error characteristics of a particular memory component among a plurality of memory components of a memory sub-system, wherein the monitored error characteristics of the particular memory component include a quantity of codewords having a bit flip count greater than a threshold bit flip count value associated therewith or a zero-to-one bit flip count greater than a threshold zero-to-one bit flip count value associated therewith, or both;
detecting, by the processing device and based on the monitored error characteristics, an error characteristic associated with the particular memory component that exhibits a value that is greater than or equal to a threshold error characteristic value; and
causing, by the processing device, a counter coupled to the plurality of memory components to be updated in response to the detection that the particular memory component exhibits the value of the error characteristic that is greater than or equal to the threshold error characteristic value.

2. The method of claim 1, wherein the memory components comprise memory dice.

3. The method of claim 1, wherein the memory components are provided in the form of an application-specific integrated circuit.

4. The method of claim 1, wherein the monitored error characteristics of the memory components include a quantity of codeword errors or a quantity of codeword errors for corrected codewords, or both.

5. The method of claim 1, further comprising:
analyzing, by the processing device, information stored by the counter to determine quality characteristics of each of the memory components; and
assigning workloads to the memory components based, at least in part, on the quality characteristics of each of the memory components.

6. An apparatus, comprising:
a processing device; and
a memory sub-system comprising a plurality of memory dice communicatively coupled to the processing device, wherein the processing device is configured to:
monitor characteristics of the plurality of memory dice during operation of the memory sub-system, wherein the monitored characteristics of the plurality of memory dice include a quantity of codewords having a bit flip count greater than a threshold bit flip count value associated therewith or a zero-to-one bit flip count greater than a threshold zero-to-one bit flip count value associated therewith, or both;
cause statistics counters coupled to the plurality of memory dice to be updated in response to detection of an event involving the monitored characteristics; and
analyze information stored by the statistics counters to determine quality characteristics of the plurality of memory dice.

7. The apparatus of claim 6, wherein the monitored characteristics of the plurality of memory dice include a quantity of codeword errors or a quantity of codeword errors for corrected codewords, or both.

8. The apparatus of claim 6, wherein each of the plurality of memory dice comprises an application-specific integrated circuit.

9. The apparatus of claim 6, wherein the processing device is configured to assign workloads to particular memory dice among the plurality of memory dice based, at least in part, on the quality characteristics of the plurality of memory dice.

10. The apparatus of claim 6, wherein the processing device is configured to perform a debugging operation invoking at least one of the plurality of memory dice based, at least in part, on the quality characteristics of the plurality of memory dice.

11. A system, comprising:
a plurality of memory components;
a plurality of counters coupled to the memory components; and
a memory statistics component coupled to the plurality of memory components and the plurality of counters, wherein the memory statistics component is to perform operations comprising:
monitoring characteristics of codewords written to the plurality of memory components;
causing respective counters among the plurality of counters to be updated in response to detection of an event involving the monitored characteristics of the codewords written to the plurality of memory components;
analyzing information stored by the counters to determine quality characteristics of each of the memory components based on the monitored characteristics of the codewords written to the memory components; and
perform operations comprising assigning workloads to the memory components based, at least in part, on the quality characteristics of each of the memory components.

12. The system of claim 11, wherein the monitored characteristics of the codewords include a quantity of codeword errors or a quantity of codeword errors for corrected codewords, or both.

13. The system of claim 11, wherein the monitored characteristics of the codewords include a quantity of codewords having a bit flip count greater than a threshold bit flip count value associated therewith or a zero-to-one bit flip count greater than a threshold zero-to-one bit flip count value associated therewith, or both.

14. The system of claim 11, wherein die memory statistics component is to perform operations comprising performing a debugging operation invoking at least one of the plurality of memory components based, at least in part, on the quality characteristics of the plurality of memory components.

15. The system of claim 11, wherein the memory components comprise memory dice.

16. The system of claim 11, wherein the plurality of memory components are formed on an application-specific integrated circuit.

17. The system of claim 11, wherein memory statistics component is to perform operations comprising monitoring characteristics codewords written to the plurality of memory components during runtime of a memory sub-system in which the plurality of memory components are deployed.

18. A method, comprising:
monitoring, by a processing device, error characteristics of a particular memory component among a plurality of memory components of a memory sub-system;
detecting, by the processing device and based on the monitored error characteristics, an error characteristic associated with the particular memory component that exhibits a value that is greater than or equal to a threshold error characteristic value;
causing, by the processing device, a counter coupled to the plurality of memory components to be updated in response to the detection that the particular memory component exhibits the value of the error characteristic that is greater than or equal to the threshold error characteristic value;
analyzing, by the processing device, information stored by the counter to determine quality characteristics of each of the memory components; and
assigning workloads to the memory components based, at least in part, on the quality characteristics of each of the memory components.

19. An apparatus, comprising:
a processing device; and
a memory sub-system comprising a plurality of memory dice communicatively coupled to the processing device, wherein the processing device is configured to:
monitor characteristics of the plurality of memory dice during operation of the memory sub-system;
cause statistics counters coupled to the plurality of memory dice to be updated in response to detection of an event involving the monitored characteristics;
analyze information stored by the statistics counters to determine quality characteristics of the plurality of memory dice; and
assign workloads to particular memory dice among the plurality of memory dice based, at least in part, on the quality characteristics of the plurality of memory dice.

20. An apparatus, comprising:
a processing device; and
a memory sub-system comprising a plurality of memory dice communicatively coupled to the processing device, wherein the processing device is configured to:
monitor characteristics of the plurality of memory dice during operation of the memory sub-system;
cause statistics counters coupled to the plurality of memory dice to be updated in response to detection of an event involving the monitored characteristics;
analyze information stored by the statistics counters to determine quality characteristics of the plurality of memory dice; and
perform a debugging operation invoking at least one of the plurality of memory dice based, at least in part, on the quality characteristics of the plurality of memory dice.

* * * * *